Patented Oct. 28, 1941

2,260,986

UNITED STATES PATENT OFFICE 2,260,986

SOLDERING FLUX

John D. Coleman, Dayton, Ohio, assignor to General Motors Corporation, Dayton, Ohio, a corporation of Delaware No Drawing. Application November 18, 1939,
Serial No. 305,208

10 Claims. (Cl. 148—25)

This invention relates to chemistry and more particularly to soldering fluxes provided with wetting agents for reducing the surface tension of the molten solder.

I have found that the wetting agents generally used in soldering fluxes are only partially stable in the presence of and tend to react with heavy metal salts such as zinc chloride which are used in many soldering fluxes. Such reaction products are ordinarily insoluble and therefore quite objectionable in a flux.

I have found that if a polyether alcohol or a polyether alcohol compound or derivative is used as a wetting agent, it will not salt out or react with the heavy metal salts, such as zinc or stannous chloride, often used in soldering fluxes. The polyether alcohols or products I prefer are those having the general formula:

$C_nH_{2n+1}$—(—O—$C_2H_4$—)$_x$—O—$CH_2$—$CH_2$—OH in which $n$ is 6 or any integral number greater than 6 and $x$ is 3 or any integral number greater than 3.

Of this general class I prefer the polyether compounds which contain terminal alcohols of 12 to 14 carbons atoms. These products may be obtained, for example, by introducing polyglycol radicals into alcohols containing at least six carbon atoms, or ethers of the different polyhydric alcohols.

One specific example of a soft soldering flux including a polyether alcohol as a wetting agent is as follows:

Zinc chloride 15% with limits of plus or minus 1.0%
Hydrochloric acid 1.0% with limits of plus or minus .1 of 1%
Glycerine 1.1% with limits of .00 and plus .05%
Polyether alcohol compound .15% with limits of plus or minus .05%
Distilled water a quantity sufficient to make the indicated total with a specific gravity of 1.13

I find that this soldering flux is efficient and particularly desirable since it contains no ammonia or ammonia products which are objectionable when soldering certain metals such as copper or brass.

In this formulation the glycerine performs the same function as ammonium chloride in the usual soldering fluxes; that is, it prevents the crystallization of the zinc chloride when heat is applied during the soldering operation. I have found that there is a definite relationship between the heavy metal salt content, in this case zinc chloride, and the amount of glycerine necessary to suppress the crystallization. Obviously the heavy metal salt content may be varied at will as long as the glycerine content is changed accordingly. Also the acid content may be varied over wide limits depending on the application.

The polyether alcohol compound makes possible the uniform coverage of all surfaces by the flux and may be varied in each case to obtain this result at the minimum concentration since the lowest possible content of organic material is desirable due to the fact that materials of this type char under the action of heat, particularly during torch soldering operations and these charred residues increase the difficulty of subsequent cleaning operations.

Another example of a flux incorporating a wetting agent of the polyether alcohol type is as follows:

Zinc chloride 32.0 plus or minus 1.0%
Ammonium chloride 8.7 plus or minus .2%
Hydrochloric acid (29% HCl) 15.7 plus or minus .5%
Polyether alcohol compound .1 to .2%
Distilled water—A quantity sufficient for a specific gravity of 1.35 @ 60° F.

The polyether alcohol compounds can also be used as wetting agents in soldering fluxes consisting of acid, neutral or alkaline solutions of amine hydrochlorides. For example, the following flux which is particularly adapted for operations requiring the minimum of flux residue:

Ethylene diamine _____ oz. (avoir.) __ 1.69
Hydrochloric acid (36% HCl)
 _____ oz. (avoir.) __ 2.90
Ethyl alcohol (95%) _____ quart __ 1.0
Polyether alcohol compound __oz. (avoir.) __ .1
Distilled water to make _____ gallon __ 1.0

Such polyether alcohol compounds can also be used in soldering fluxes containing stannous or stannic chloride either alone or in conjunction with other heavy metal salts such as zinc chloride.

While the form of embodiment of the invention as herein disclosed, constitutes a preferred form, it is to be understood that other forms might be adopted, all coming within the scope of the claims which follow.

What is claimed is as follows:

1. In a process of soldering metals, the step of applying a soldering flux containing as a surface active wetting agent a polyether derivative of a monohydroxyl alcohol having more than five carbon atoms.

2. In a process of soldering metals, the step of applying a soldering flux containing a product corresponding to the general formula:

$$C_nH_{2n+1}-(-O-C_2H_4-)_x-O-CH_2-CH_2-OH$$

where $n$ is 6 or any integral number greater than 6 and $x$ is 3 or any integral number greater than 3.

3. In a process of soldering metals, the step of applying a soldering flux containing a chloride and a polyether derivative of a monohydroxyl alcohol.

4. In a process of soldering metals, the step of applying a soldering flux containing a chloride, hydrochloric acid and a polyether derivative of a monohydroxyl alcohol.

5. In a process of soldering metals, the step of applying a soldering flux containing a chloride, hydrochloric acid, glycerine, and a polyether derivative of a monohydroxyl alcohol.

6. In a process of soldering metals, the step of applying a soldering flux containing a chloride, glycerine, and a polyether derivative of a monohydroxyl alcohol.

7. In a process of soldering metals, the step of applying a soldering flux containing a polyether derivative of a monohydroxyl alcohol, and hydrochloric acid.

8. In a process of soldering metals, the step of applying a soldering flux containing a polyether derivative of a monohydroxyl alcohol, and an amine hydrochloride.

9. In a process of soldering metals, the step of applying a soldering flux containing a polyether derivative of a monohydroxyl alcohol, an amine hydrochloride, and an alcohol.

10. In a process of soldering metals, the step of applying a soldering flux of the following composition:

Zinc chloride 15% with limits of plus or minus 1.0%

Hydrochloric acid 1.0% with limits of plus or minus .1 of 1%

Glycerine 1.1% with limits of .00 and plus .05%

Polyether alcohol compound .15% with limits of plus or minus .05%

Distilled water a quantity sufficient to make the indicated total with a specific gravity of 1.13.

JOHN D. COLEMAN.